United States Patent [19]
Dougherty et al.

[11] Patent Number: 6,141,556
[45] Date of Patent: Oct. 31, 2000

[54] TELECOMMUNICATIONS SYSTEM WITH MULTI-EXTENSION SERVICES

[75] Inventors: Angus O. Dougherty, Westminster; Charles I. Cook, Louisville; David G. Robinson, Boulder; Giuliana Pritchard, Longmont, all of Colo.

[73] Assignee: Qwest Communications International Inc., Denver, Colo.

[21] Appl. No.: 09/320,994

[22] Filed: May 27, 1999

[51] Int. Cl.[7] .................................................. H04Q 7/20
[52] U.S. Cl. ........................... 455/445; 455/433; 455/416
[58] Field of Search .................................... 455/414, 415, 455/416, 417, 432, 433, 435, 445, 458, 459, 461, 463, 518, 519, 520, 565; 379/211

[56] References Cited

U.S. PATENT DOCUMENTS

| | | | |
|---|---|---|---|
| 5,600,704 | 2/1997 | Ahlberg et al. | 379/211 |
| 5,802,160 | 9/1998 | Kugell et al. | 379/211 |
| 5,815,562 | 9/1998 | Iglehart et al. | 379/211 |
| 5,963,864 | 10/1999 | O'Neil et al. | 455/416 |
| 5,978,672 | 11/1999 | Hartmaier et al. | 455/414 |
| 6,011,843 | 1/2000 | Hochman et al. | 379/211 |

*Primary Examiner*—Nguyen Vo
*Assistant Examiner*—Marsha D. Banks-Harold
*Attorney, Agent, or Firm*—Brooks & Kushman

[57] ABSTRACT

A telecommunication system and method for providing multi-extension service utilizes a location register having information stored therein and representing a line group having multi-extension capabilities. The line group includes a plurality of call receiving user devices with each device having a corresponding directory number. The line group further has a primary directory number. Control logic is configured to process an incoming call to the primary directory number by sending a signal indicative of the incoming call to each user device in the plurality of call receiving user devices.

21 Claims, 2 Drawing Sheets

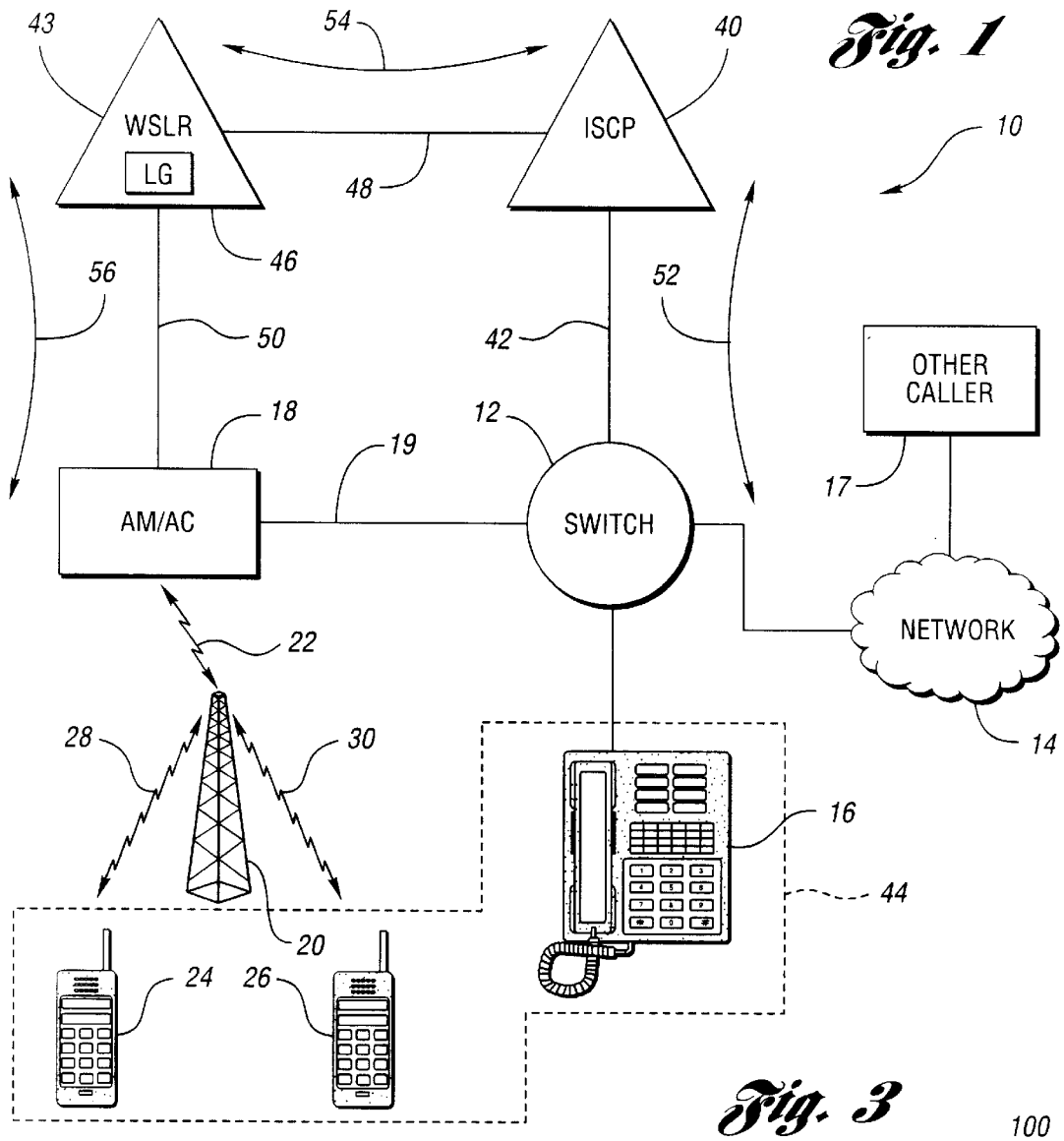

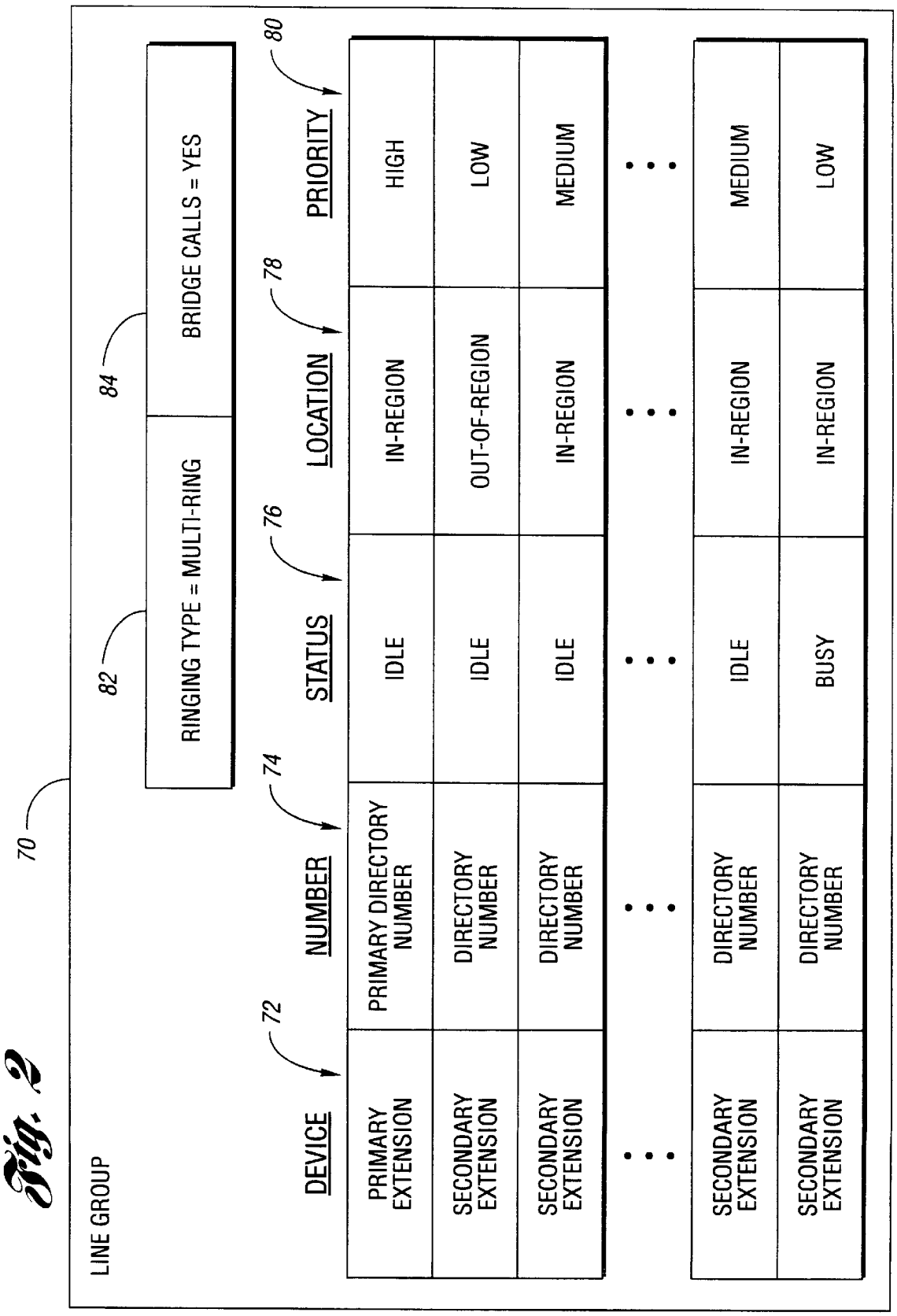

TELECOMMUNICATIONS SYSTEM WITH MULTI-EXTENSION SERVICES

TECHNICAL FIELD

The present invention relates to telecommunications systems and methods for providing multi-extension services.

BACKGROUND ART

The primary elements of an existing wireline intelligent network are a switching system, a signaling network, a centralized database, and an operations support system which supports the database. In general, the switching system intercepts a call from a call source, and suspends call processing while launching a query through the signaling network to the centralized database. The database, in turn, retrieves the necessary information to handle the call, and returns that information through the signaling network to the network switch, which may be a local digital switch, so that the call can be completed. The operations support system administers the appropriate network and customer information.

The intelligence of the intelligent network is found at the service control point. A service control point is a transaction-processing database which provides call-handling information in response to network queries. The signaling network is made up of signal transfer points. A signal transfer point is a packet switch found in the common-channel signaling network. The signal transfer point is used to route signaling messages between network access nodes, such as switches and service control points. Signaling System 7 is a common communications protocol used in common-channel signaling networks.

In addition to the existing wireline application intelligent networks that have been in use for many years, wireless application network systems have become widespread. Unfortunately, wireless application networks sometimes fail to take advantage of existing wireline architecture, but instead employ a separate wireless application network. As such, many customers subscribe to wireless services in addition to wireline services. Further, many of those customers have several wireless devices with each wireless device having a separate identity to the wireless network, in addition to one or even several different wireline services.

As such, a customer may end up having a variety of different telephony devices, with each device having a separate telephone number, some of those devices being wireless and some of those devices being wireline based. A resultant disadvantage is the fact that at a given time a customer may have a call in progress on one device and have an immediate desire to switch that call to a different device. For example, a customer at home may have a call in progress on a wireline device, and for some reason, decide that it would be more convenient to switch the call to the other wireline device, or may decide that it would be convenient to switch the call to a wireless device.

Further, a customer may have a call in progress on a wireless device, and upon arriving at home decide it would be more convenient to switch the call to one of the customer's wireline devices. Unfortunately, many existing systems of both the wireless and wireline types do not support features to allow a customer to switch an in progress call from one device to another conveniently. As such, it is necessary for the customer to, if switching the call is of most importance, terminate the call in progress only to make another call from the other device to re-establish communication.

For the foregoing reasons, there is a need for systems and methods that reduce the burden placed on the end customer by requiring that in order to switch a call from one device to another, that a customer must undergo the burden of terminating the in progress call only to reconnect again with the other device.

DISCLOSURE OF INVENTION

It is therefore an object of the present invention to provide a system and method that provides multi-extension services utilizing a location register having information stored therein representing a line group including a plurality of user devices.

In carrying out the above object, a telecommunication system for providing multi-extension services is provided. The telecommunication system comprises a location register and associated control logic. The location register has information stored therein representing a line group including a plurality of call receiving user devices. Each user device has a corresponding directory number. The line group further has a primary directory number, which may be the directory number for one of the user devices. The control logic is configured to process an incoming call to the primary directory number by sending a signal indicative of the incoming call to each user device in the plurality of call receiving user devices. A manner in which the signal is sent to the plurality of call receiving user devices may, if desired, be selectable by the customer.

In one configuration, the signal indicative of the incoming call is sent simultaneously to each user device in the plurality of call receiving user devices. As such, the control logic is configured such that upon answering of the incoming call in response to the signal by a user with one of the user devices, the sending of the signal to the remaining user devices is discontinued. A voice path is then established for the answering user device so that the user may communicate with the other caller.

In another configuration, the signal indicative of the incoming call is sent sequentially to each user device in the plurality of call receiving user devices. As such, the control logic is configured such that upon answering of the incoming call in response to the signal by a user with one of the user devices, the sending of the signal to the remaining user devices in the sequence is discontinued. Then, a voice path is established for the answering user device so that the user may communicate with the other caller.

In yet another configuration, the primary directory number is a bridging number. The control logic is configured such that upon answering of the incoming call in response to the signal by a user with one of the user devices, a voice path is established for the answering user device and for any additional devices that answer the call within a pre-selected period of time. That is, the call is bridged to additional devices if a user at those devices responds to the incoming call signal within the pre-selected period of time. The control logic is preferably further configured such that after the expiration of the pre-selected period of time, additional devices that place a call to the bridging number are added to the voice path. That is, additional devices may bridge into the call, while the call is in progress, by placing a call to the bridging number.

It is preferred that the primary directory number is one of the directory numbers corresponding to the plurality of call receiving devices. Further, in a preferred embodiment, the incoming call has a calling line identification, and the signal indicative of the incoming call is further indicative of the calling line identification. That is, a user is informed of the caller's identity so that the user may decide whether or not to receive the incoming call. Further, the control logic is preferably configured to transfer the incoming call from the answering user device to a different user device upon reception of a call transfer signal from the answering user device. That is, preferred embodiments permit call transfers to other user devices within the line group.

In a preferred embodiment, the line group is stored in a location register as a dynamic line group such that user devices may be dynamically registered to and dynamically deregistered from the line group. In such a preferred implementation, the control logic may be configured to automatically deregister a user device having a status of busy, and to automatically register a user device having a status of idle. Further, the control logic may be configured to automatically deregister a user device having a status of out-of-region, and to automatically register a user device having a status of in-region. Still further, the control logic may be configured to, on demand by a user, manually set a relative priority for a user device within the associated line group. The relative priority may be used, for example, to determine the ringing sequence when sequential ringing is implemented (instead of simultaneous multi-ringing). Of course, it is to be appreciated that the plurality of user devices in the line group may include any number of wireline user devices and also include any number of wireless user devices in different embodiments of the present invention.

Of course, the automatic deregistration scenarios mentioned above may be omitted and instead allow the user to manually cause the device to remain registered, while allowing the user to manually enable or disable incoming call notification. That is, the user may opt for a selective call redirection to have calls ring the device, or to have calls go directly to voice mail, or the user may decide to manually deregister from the line group.

Further, in carrying out the present invention, a telecommunications method for providing multi-extension services is provided. The method comprises establishing a line group including a plurality of call receiving devices. Each device has a corresponding directory number. The line group further has a primary directory number. The method further comprises, upon receiving an incoming call to the primary directory number, sending a signal indicative of the incoming call to each user device in the plurality of call receiving user devices.

The advantages associated with embodiments of the present invention are numerous. For example, systems and methods of the present invention for providing multi-extension services to wireless and/or wireline networks utilize a line group to facilitate the switching of a call from one user device to another user device. This ability to conveniently switch calls from one device to another, such as from a wireless device to a wireline device or from a wireline device to a wireless device is convenient for the end user. For example, the user may have a call in progress on a wireless device, arrive at home, and desire to switch the call to the wireline device within the user's home. Or, on the other hand, a user may have a call in progress on a wireline device at the user's home or office, and desire to switch the call to a wireless device so that the user may leave his or her present location while continuing the call that is in progress. Embodiments of the present invention reduced the hassle associated with having to hang up one call and call back to talk to the same party just because it was desired to switch calling devices.

The above object and other objects, features and advantages of the present invention are readily apparent from the following detailed description of the best mode for carrying out the invention when taken in connection with the accompanying drawings.

BRIEF DESCRIPTION OF DRAWINGS

FIG. 1 is a diagram illustrating a system of the present invention for providing multi-extension services utilizing a line group at a location register;

FIG. 2 is a diagram illustrating information stored at the location register representing a line group in preferred embodiments of the present invention; and FIG. 3 is a block diagram illustrating a method of the present invention for providing multi-extension services.

BEST MODE FOR CARRYING OUT THE INVENTION

With reference to FIG. 1, a system of the present invention for providing multi-extension services is generally indicated at 10. System 10 preferably includes a network that provides service for both wireless and wireline applications. Of course, it is to be appreciated that one of ordinary skill in the art may make variations to the network while still utilizing embodiments of the present invention for providing multi-extension services. System 10, as shown, includes a switch 12 which may be a local digital switch. Of course, it is to be appreciated that system 10 may include numerous switches spread out over the network, and only one switch is shown for convenience. Similarly, it is to be appreciated that wireless and wireline networks may be employed with very complex structure, and the schematic diagram illustrated in FIG. 1 is simplified for convenience in understanding utilization of a line group to provide multi-extension services in accordance with the present invention.

Switch 12 is connected to a network 14 so that a call from an end user at wireline user device 16 may be connected to another caller at a different user device 17 connected to network 14 in any manner known to those skilled in the art of telecommunication systems.

An access manager/access controller 18 is connected to switch 12 by an interface 19. Access manager/access controller 18, which controls wireless calls over system 10, communicates with a base station transceiver 20 as indicated by arrow 22. Transceiver 20 in turn communicates with any number of wireless devices, such as user wireless devices 24 and 26, with communication being indicated by arrows 28 and 30, respectively. That is, wireline user device 16, wireless user device 24, and wireless user device 26 are each configured to, as desired, place or receive calls over network 14 to a distant user device 17.

System 10, as illustrated, includes an integrated service control point 40 connected to switch 12 by link 42. The location register, which is preferably implemented as a Wireless Service Location Register (WSLR) 43, is connected to integrated service control point 40 by link 48. Wireless Service Location Register 43 is connected by link 50 to access manager/access controller 18.

In accordance with the present invention, Wireless Service Location Register 43 has information stored therein, which is indicated by block 46. The information stored in the Wireless Service Location Register 43 represents a line group 44. Line group 44, as illustrated, includes wireline user device 16 and wireless user devices 24 and 26. Of course, a line group may include any number of wireless and/or wireline devices as desired by the end user.

In accordance with the present invention, multi-extension services are provided to the user devices within line group 44. The multi-extension services preferably provide enhanced bridging and conferencing capabilities and services that allow for the ability to emulate traditional wireline extension capabilities associated with a single phone number that may have multiple telephone devices on the same line. This emulation allows devices on separate lines (both wireline and wireless) to behave as a group of related lines as will be further described.

Embodiments of the present invention are advantageous in that current wireless phone systems such as Personal Communication System (PCS) and cellular based systems do not readily support extension capabilities that allow a subscriber with multiple handsets (wireline and/or wireless) to allow a party on a phone associated with a particular directory number to join in on a conversation of another party on another phone that is also associated with the same directory number.

Embodiments of the present invention allow for a party that answers a call on a phone (wireless or wireline) to request another individual at another location to pick up the wireless or wireline phone at that location to automatically join in the conversation. Further, embodiments of the present invention allow the user to register a number of phones in the network, both wireline and wireless, to be able to terminate incoming calls for the primary directory number. This advantageously allows a person to participate in a call at his or her home on a wireline phone, and then be able to transfer to a wireless handset so that the person can continue to participate in the call as they leave the house and travel with their vehicle.

Of course, it is to be appreciated that the control logic utilized to implement embodiments of the present invention may be implemented in a variety of ways. For example, the control logic may be implemented with conferencing circuits in a switch (such as switch 12), an adjunct, or through the use of intelligent peripherals (intelligent wireless or wireline handsets). For example, embodiments of the present invention may provide multiple ring, sequential ring, or bridge ring for an incoming call to the primary telephone directory number of the line group. Of course, as desired, calls that are not to the primary number may only ring the particular phone being called, while calls to the primary number ring all phones in the line group.

Line group information 46 which describes the devices in line group 44 and also describes the appropriate ways to route calls to the line group is better understood with reference to FIG. 2. In FIG. 2, line group information 70 in an exemplary embodiment is illustrated.

As shown, the line group may include any number of devices including both wireless and wireline devices, as indicated at column 72. At column 74, the directory number associated with each device or extension is listed next to the device. As indicated in the line group information, one of the devices is the primary extension having the primary directory number. That is, calls to the primary directory number are routed to all of the devices, while calls to the other directory numbers are only routed to their associated secondary extension. In preferred embodiments of the present invention, line group information also includes a status column 76. The status of a user device may be either idle (awaiting a call) or busy (call in progress). As such, when a call is received on primary extension, the call may be routed in accordance with the desired ringing technique (for example, multi-ring, sequential ring, or bridge ring), while only routing the call to the idle extensions and temporarily ignoring the busy extensions. Alternatively, busy extensions may be notified of an incoming call with a call waiting feature.

Further, particularly for wireless devices, it may be desirable to only route calls to wireless devices that are within a preselected region. As such, it may be desirable to include a location column 78 in the line group information 70. As such, when a call is received at the primary directory number, the call may be appropriately routed to all in-region devices, while temporarily not treating the out-of-region extensions as part of the line group. This is similar to the treatment of busy extensions. Still further, it may be desirable to provide priority information as shown in column 80. For example, in sequential ringing applications, wherein a call to the primary directory number is rung sequentially through the different extensions in the line group, the sequential order may be determined based on user selectable priorities. That is, the call is first rang at all high priority extensions, then at medium priority extensions, and then at low priority extensions. That is, a user may, for example, desire that all calls to the primary directory number be first routed to the user mobile phone, and then immediately routed to the user's office phone, and then to the user's home phone, and then possibly to yet a different phone.

Of course it is to be appreciated that in accordance with the present invention, control logic may be implemented to automatically register and deregister devices from a line group. For example, busy extensions may be automatically deregistered while idle extensions (or busy extensions with a call waiting feature) may be automatically registered. For another example, in-region devices may be automatically registered while out-of-region devices may be automatically deregistered.

Of course, any of the above autoregistration features may be instead implemented to require manual registration. That is, a device may remain registered while allowing the user a number of choices for selective redirection. That is, a user may manually enable or disable incoming call notification while keeping the device registered. For example, incoming calls may be directed to ring the device, go directly to voice mail, or still, the device may be manually deregistered from the line group. Still further, the call redirection may allow the user to select different types of redirection for different device statuses and locations. For example, calls to an out-of-region device may go directly to voice mail, while that same call when the device is in region, would ring the device. Of course, the above examples for call redirection, manual and automatic registration features are exemplary in nature, and it is appreciated that numerous call features may provide additional benefits to the line group, and are within the spirit of this invention.

As will be further described below, line group information 70 may also include a desired ringing type 82, such as multi-ring or sequential ring, and instructions as to whether bridge calls are allowed, as shown in 84.

With reference to FIG. 3, a method of the present invention is generally indicated at 100. At block 102, a line group is established. The line group may include any number of wireless or wireline devices. Accordingly, line group information is established at the location register. At block 104, the primary line number is established. That is, calls to the primary line number are sent to the entire group of devices, while calls to any of the other line numbers are sent to the particular device having that number. At block 106, an incoming call to the primary line number is received.

Appropriate control logic sends a signal indicative of the incoming call as indicated at block 108.

The signal indicative of the incoming call is sent to each user device of the plurality of call receiving user devices of the line group. Of course, the signal may be sent in a variety of fashions, as desired. For example, the signal may be simultaneously sent to all of the devices or handsets. That is, the system simultaneously rings multiple handsets within the line group on an incoming call to the primary directory number. This in effect provides the customer with multiple extensions to a primary home or office number.

In a multi-ring configuration, upon answering of the incoming call in response to the signal by a user with one of the user devices, a voice path is established for the answering device at block 110. That is, the first handset to declare answer will take control of the call and a two-way voice path is established with the incoming caller. Notification to the other handsets will be stopped. All other handsets attempting to answer the call will be provided with a visual and/or audible treatment to indicate that another extension has answered the call. That is, as indicated by block 112, the incoming call signal is discontinued to the remaining devices.

In a sequential-ring configuration, the handsets are rung sequentially in a either a predefined order, or in order based on relevant priorities contained in the line group information at the location register. That is, a pre-assigned ring schedule may be designated for the line group, and the schedule is then followed when an incoming call occurs for the primary line number. Further, it is preferred that a "ring-no-answer" condition for each attempted delivery of the call to a device will be limited to minimize calling party ring-back delay.

Further, in yet another configuration for the present invention, the primary directory number may be designated as a bridge number. Bridge ringing provides the ability for the system to simultaneously ring multiple handsets within a line group on an incoming call to the bridge number. This in effect provides the customer with a multi-line extension capability for home or office. If bridge-ring is applied to the home or office number, the system will simultaneously distinctively ring on all active and available handsets within the line group. Under the bridge-ring provisions, it is preferred that as each handset answers the call they will be bridged onto a conference circuit, and a two-way voice path will be established with the incoming caller as well as each joining member of the line group. A tone should be provided to identify members adding on and dropping from the bridge.

Members of a line group can only add to the call during the ring notification cycle. Which is a pre-established period of time. If a member misses answering the call during the notification cycle, or the call is inadvertently dropped, the user can re-join (or join) the bridge by manually dialing the assigned conference bridge number. It may be desirable to provide a soft-key on the handset (wireline or wireless) that actuates an active register in the handset to which the unique bridge number was delivered with Short Messaging Service (SMS).

Further, preferred embodiments of the present invention in multi-ring, sequential ring, and bridge ring embodiments provide additional features. For example, it is preferred that calling line identification be cast to all the handsets during the ring cycle. Further, it is preferred that each user device has the ability to transfer a call to any other user device within the line group. Still further, it is preferred that calling line identification, call waiting, and voicemail notification be provided on the different user devices of the line group and that voicemail service be provided on the line group's primary directory number.

While the best mode for carrying out the invention has been described in detail, those familiar with the art to which this invention relates will recognize various alternate designs and embodiments for practicing the invention as defined by the following claims.

What is claimed is:

1. A telecommunications system for providing multi-extension services, the system comprising:
   a location register having information stored therein representing a dynamic line group including a plurality of call receiving user devices with each device having a corresponding directory number, the line group further having a primary directory number; and
   control logic configured to process an incoming call to the primary directory number by sending a signal indicative of the incoming call to each user device in the plurality of call receiving user devices, the control logic further configured to automatically register and deregister a user device with the line group based on a status of that user device.

2. The system of claim 1 wherein the signal indicative of the incoming call is sent simultaneously to each user device in the plurality of call receiving user devices.

3. The system of claim 2 wherein the control logic is configured such that upon answering of the incoming call in response to the signal by a user with one of the user devices, the sending of the signal to the remaining user devices is discontinued and a voice path is established for the answering user device.

4. The system of claim 1 wherein the signal indicative of the incoming call is sent sequentially to each user device in the plurality of call receiving user devices.

5. The system of claim 4 wherein the control logic is configured such that upon answering of the incoming call in response to the signal by a user with one of the user devices, the sending of the signal to the remaining user devices in the sequence is discontinued and a voice path is established for the answering user device.

6. The system of claim 1 wherein the primary directory number is a bridging number, and wherein the control logic is configured such that upon answering of the incoming call in response to the signal by a user with one of the user devices, a voice path is established for the answering user device and for any additional devices that answer the call within a preselected period of time.

7. The system of claim 6 wherein the control logic is further configured such that after the expiration of the preselected period of time, additional devices that place a call to the bridging number are added to the voice path.

8. The system of claim 1 wherein the primary directory number is one of the directory numbers corresponding to the plurality of call receiving devices.

9. The system of claim 1 wherein the incoming call has a calling line identification and wherein the signal indicative of the incoming call is further indicative of the calling line identification.

10. The system of claim 1 wherein the control logic is configured to transfer the incoming call from the answering user device to a different user device upon reception of a call transfer signal from the answering user device.

11. The system of claim 1 further comprising:
    control logic configured to automatically deregister a user device having a status of busy, and to automatically register a user device having a status of idle.

12. The system of claim 1 further comprising:
control logic configured to automatically deregister a user device having a status of out-of-region, and to automatically register a user device having a status of in-region.

13. The system of claim 1 further comprising:
control logic configured to, on demand by a user, manually select a call redirection scheme for incoming calls to the user device.

14. The system of claim 1 further comprising:
control logic configured to, on demand by a user, manually set a relative priority for a user device within the associated line group.

15. The system of claim 1 wherein the plurality of user devices includes at least one wireless user device.

16. The system of claim 1 wherein the plurality of user devices includes at least one wireline user device.

17. A telecommunications method for providing multi-extension services, the method comprising:
establishing a dynamic line group including a plurality of call receiving devices with each device having a corresponding directory number including automatically registering and deregistering a user device with the line group based on a status of that user device, the line group further having a primary directory number; and
upon receiving an incoming call to the primary directory number, sending a signal indicative of the incoming call to each user device in the plurality of call receiving user devices.

18. The method of claim 17 wherein sending the signal further comprises:
simultaneously sending the signal to each user device in the plurality of user devices.

19. The method of claim 17 wherein sending the signal further comprising:
sequentially sending the signal to each user device in the plurality of user devices.

20. The method of claim 17 further comprising:
upon answering of the incoming call in response to the signal by a user with one of the user devices, establishing a voice path for the answering user device and discontinuing the sending of the signal indicative of the incoming call to the remaining user devices.

21. The method of claim 17 wherein the primary directory number is a bridging number, and wherein the method further comprises:
upon answering of the incoming call in response to the signal by a user with one of the user devices, establishing a voice path for the answering user device and for any additional user devices that answer the call within a preselected period of time.

* * * * *